(12) United States Patent
Konno et al.

(10) Patent No.: US 6,510,302 B1
(45) Date of Patent: Jan. 21, 2003

(54) IMAGE FORMING APPARATUS AND METHOD OF CONTROLLING THE APPARATUS

(75) Inventors: Michiaki Konno, Yokohama (JP); Yuusuke Hashizume, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/717,234

(22) Filed: Apr. 4, 2001

(51) Int. Cl.⁷ .................... G03G 15/04; G03G 15/28; G03G 15/30
(52) U.S. Cl. .................................................. 399/208
(58) Field of Search .................... 399/208, 51, 200, 399/202, 212

(56) References Cited

U.S. PATENT DOCUMENTS

| | | | | |
|---|---|---|---|---|
| 4,371,254 A | * | 2/1983 | Beery | 399/208 |
| 4,561,771 A | * | 12/1985 | Sugiura | 399/208 |
| 4,586,808 A | * | 5/1986 | Tanimoto et al. | 399/200 |
| 5,839,039 A | * | 11/1998 | Yamada | 399/298 |

FOREIGN PATENT DOCUMENTS

JP  9-146184  6/1997

* cited by examiner

Primary Examiner—Quana M. Grainger (57) ABSTRACT

When a carriage goes forth, a scan motor is first acceleratively operated, then is operated by a constant speed, and finally is operated deceleratively. When the carriage goes back, the scan motor is operated by a constant speed from beginning to end.

20 Claims, 6 Drawing Sheets

| MIN = 48%, MAX = 222% | | | |
|---|---|---|---|
| DATA IDENTIFIER | MAGNIFICATION | TARGET SPEED (PPS) | SUM TIME |
| DW 1115 | 48% | 2362.23pps | 27.614ms |
| DW 1110 | 49% | 2273.21pps | 26.457ms |
| DW 1016 | 50% | 2187.74pps | 25.513ms |
| DW 1011 | 51% | 2105.63pps | 24.307ms |
| DW 971 | 52% | 2026.68pps | 23.322ms |
| DW 941 | 53% | 1950.70pps | 22.569ms |
| DW 901 | 54% | 1877.54pps | 21.547ms |
| DW 874 | 55% | 1807.04pps | 20.766ms |
| DW 842 | 56% | 1739.06pps | 19.971ms |
| DW 801 | 57% | 1673.46pps | 19.162ms |
| DW 782 | 58% | 1610.12pps | 18.339ms |
| DW 752 | 59% | 1548.93pps | 17.499ms |
| DW 730 | 60% | 1489.79pps | 16.931ms |
| DW 700 | 61% | 1432.58pps | 16.063ms |
| ⋮ | ⋮ | ⋮ | ⋮ |

IMAGE FORMING APPARATUS AND METHOD OF CONTROLLING THE APPARATUS

BACKGROUND OF THE INVENTION

In an image forming apparatus, such as a copying machine or the like, exposure means is reciprocatively moved along a document table by the operation of a scan motor, and at the time of the going forth motion, the document table is scanned and is exposed to read an image on a document so that the read image is formed on a sheet of copy paper that is an image formed medium. A pulse motor is employed as the scan motor.

The exposure means has an exposure lamp and a carriage on which the exposure lamp is mounted as the components thereof. The carriage is reciprocatably provided along the document table and is coupled with a shaft of the scan motor via a power transmission mechanism, such as a belt, a wire, and the like so as to reciprocate, while receiving the power of the scan motor.

When the carriage goes forth, the scan motor first operates acceleratively to a target speed, then operates by a constant speed after reaching the target speed, and finally operates deceleratively. During the period in which the scan motor operates by a constant speed, the image on the document is read. When the carriage goes back, also, the scan motor first operates acceleratively, then operates by a constant speed, and finally operates deceleratively.

Drive control data for the scan motor of the time of going forth motion and drive control data for the scan motor of the time of going back motion are stored in storage means, for example, a memory.

If the amount of the drive control data is large, the capacity of the memory is increased, thereby causing an increase in the cost.

BRIEF SUMMARY OF THE INVENTION

The present invention is developed, considering the above described circumstances, and it is an object of the present invention to provide an image forming apparatus and method of controlling the apparatus wherein the drive control data for the motor for the exposure means can be reduced considerably, whereby the capacity of the storage means can be reduced or an empty capacity of the storage means can be increased to enable an effective utilization of the empty capacity.

An image forming apparatus of the present invention reciprocatively operates exposure means along a document table by an operation of a motor, scans and exposes the document table when the exposure means goes forth to read the image of the document, and forms the read image on an image formed medium, the apparatus comprising first control means for first acceleratively operating, then operating by a constant speed, and finally deceleratively operating the motor when the exposure means goes forth and second control means for operating the motor by a constant speed from beginning to end when the exposure means goes back.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will be explained below, referring to drawings.

Figure 1:
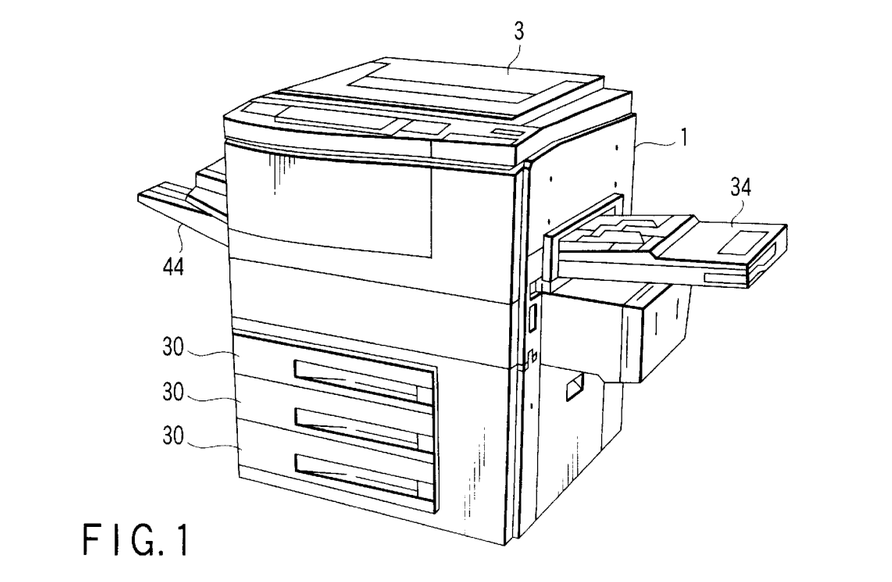
FIG. 1 is a view showing an appearance of one embodiment.
Figure 2:
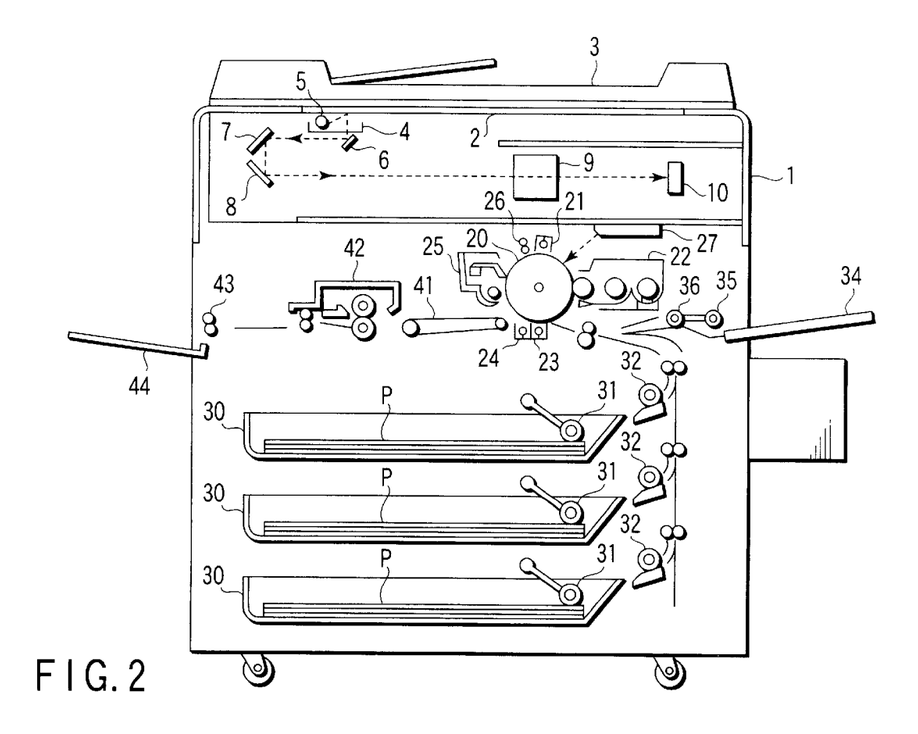
FIG. 2 is a view showing an inside constitution of one embodiment.

A transparent document table (glass plate) 2 for placing a document is provided on the upper part of a main body 1 as shown in FIG. 1 and FIG. 2. An automatic document feeder (ADF) 3 is openably/closably provided on that original table 2. The automatic document feeder 3 automatically feeds a set document to the document table 2 one by one.

Figure 3:
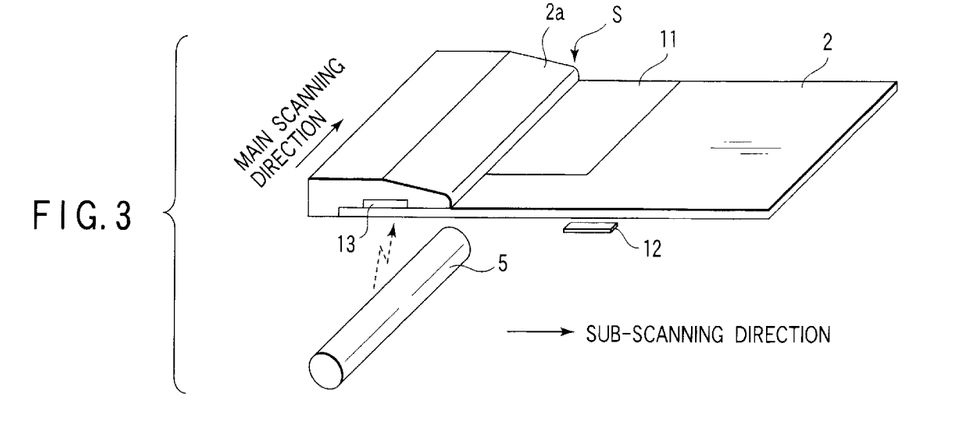
FIG. 3 is a view showing the constitution of a document table and its peripheral part in one embodiment.

An indicator 2a is attached to the document table 2 as shown in FIG. 3. The boundary part between that indicator 2a and the document table 2 corresponds to a reference position S for setting a document. A document 11 is set corresponding to this reference position S.

A carriage 4 is provided in the lower face side of the document table 2, and an exposure lamp 5 is provided on the carriage 4. Exposure means is composed of this carriage 4 and the exposure lamp 5. The carriage 4 can reciprocate along the lower face of the document table 2. The carriage 4 goes forth and the exposure lamp 5 is lighted so that the document 11 set on the document table 2 is scanned and exposed.

By this scanning and exposing, a reflection optical image of the document 11 placed on the document table 2 is obtained, and the image is projected on a CCD 10 (Charge Coupled Device) by reflection mirrors 6, 7, and 8 and a lens block 9 for varying power. The CCD 10 has a number of photoelectric transfer elements and outputs an image signal corresponding to the image projected. This image signal is converted into a digital signal, and the digital signal is corrected appropriately by an image correction circuit to be supplied to a laser unit 27. The laser unit 27 emits a laser beam according to the input signal.

The going forth direction of the exposure lamp 5 is called a sub-scanning direction, and the direction perpendicular to this sub-scanning direction is called a main scanning direction.

A document sensor 12 is provided on the lower face side of the document table 2. The document sensor 12 detects whether or not the document 11 is set on the document table 2 by receiving a reflection light from the document table 2 based on the lighting of the exposure lamp 5 and detects the size of the document 11 set on the document table 2.

A plate 13 for correcting shading is provided in the lower face side of the indicator 2a.

Figure 4:
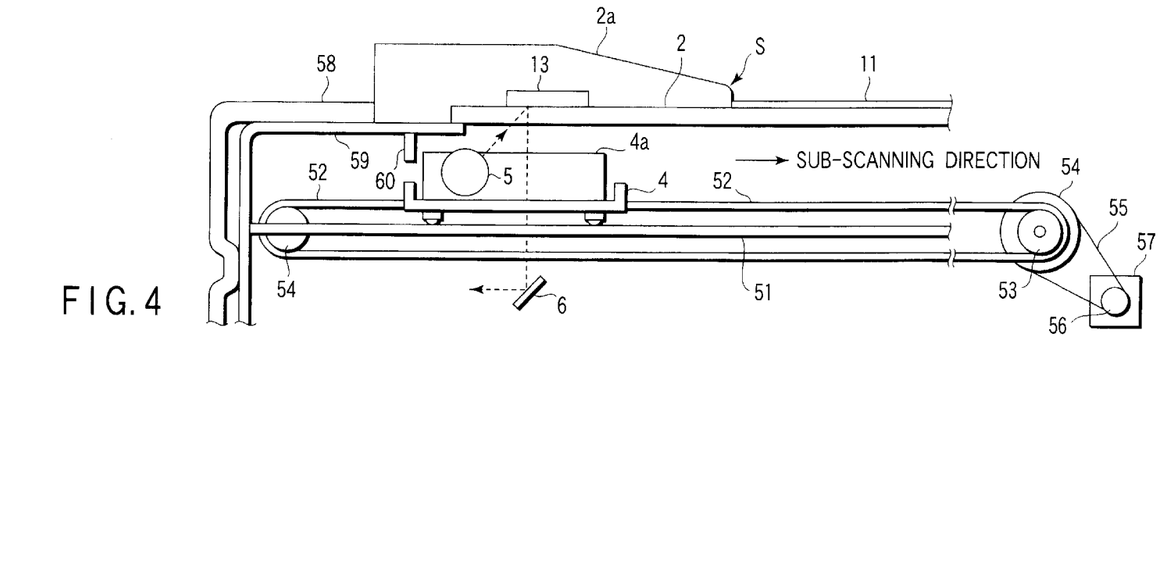
FIG. 4 is a view showing the constitution of a carriage and its peripheral part in one embodiment.

The carriage 4 is movably placed on a rail 51 as shown in FIG. 4. The carriage 4 is coupled with a wire 52, the wire 52 is laid along a driving pulley 53 and driven pulleys 54. The driving pulley 53 is coupled with a deceleration pulley 54, and the deceleration pulley 54 is coupled with a pulley 56 of a scan motor 57 via a timing belt 55. A pulse motor is employed as the scan motor 57.

The movement position of the carriage 4 is managed by a supply number (step number) of a driving voltage pulse for the scan motor 57.

The outer peripheral surface of the main body 1 is formed by a cover 58. A frame 59 for holding the rail 51 is provided inside the cover 58. A home switch 61 is provided on this frame 59. The home switch 61 has a slit for receiving invasion of a light shielding plate 4a of the carriage 4 so as to optically detect whether or not the light shielding plate 4a invades inside the slit 4 and is turned on when the light shielding plate 4a has invaded and is turned off when it has not invaded. When the home switch 61 is turned on, it can be decided that the carriage 4 exists at a predetermined home position.

A photoreceptor drum 20 is rotatably provided roughly in the central part of the inside of the main body. On the periphery of this photoreceptor drum 20, an electrostatic charger 21, a developing device 22, a transfer device 23, a detachment device 24, a cleaner 25, and a static eliminator 26 are arranged sequentially. The laser beam emitted from the laser unit 27 is radiated to the surface of the photoreceptor drum 20 through the space between the electrostatic charger 21 and the developing device 22.

A plurality of paper feed cassettes 30 are provided in a bottom part inside the main body 1. A number of sheets of copy papers P of mutually different sizes are accommodated in the paper feed cassettes 30 as image formed mediums. A sheet of copy paper P is taken out of either one of the respective paper feed cassettes 30 one by one according to an ON operation of a copy key (not shown) and according to a detection size of the document sensor 12. A pickup roller 31 is provided for each paper feed cassette 30 as means for that taking out. The each copy paper P taken out is detached from the paper feed cassette 30 by a detachment device 32 to be sent to a resist roller 33.

The resist roller 33 sends the paper P between the photoreceptor drum 20 and the transfer device 23 by the timing considering the rotation of the photoreceptor drum 20.

The electrostatic charger 21 takes electrostatic charge on the surface of the photoreceptor drum 20 by applying a high voltage to the photoreceptor drum 20. The laser beam emitted from the laser unit 27 is radiated to the surface of the photoreceptor drum 20 for which the electrostatic charging is executed so that an electrostatic latent image is formed on the surface of the photoreceptor drum 20.

The electrostatic latent image on the photoreceptor drum 20 is revealed by receiving developing powder (toner) by the developing device 22. This revealed image is transferred to the copy paper P by the transfer device 23. The copy paper P on which the revealed image is transferred is detached from the photoreceptor drum 20 by the detachment device 24. The detached copy paper P is sent to a fixing device 42 by a conveyer belt 41. The fixing device 42 fixes the transferred image on the copy paper P by heat. The copy paper P for which fixing is completed is discharged to a paper discharge tray 44 by a paper discharge roller 43.

The developing powder and the electric charge remain on the surface of the photoreceptor drum 20 from which the copy paper P is detached. The remaining developing powder is removed by the cleaner 25. The remaining electric charge is removed by the static eliminator 28.

Figure 5:
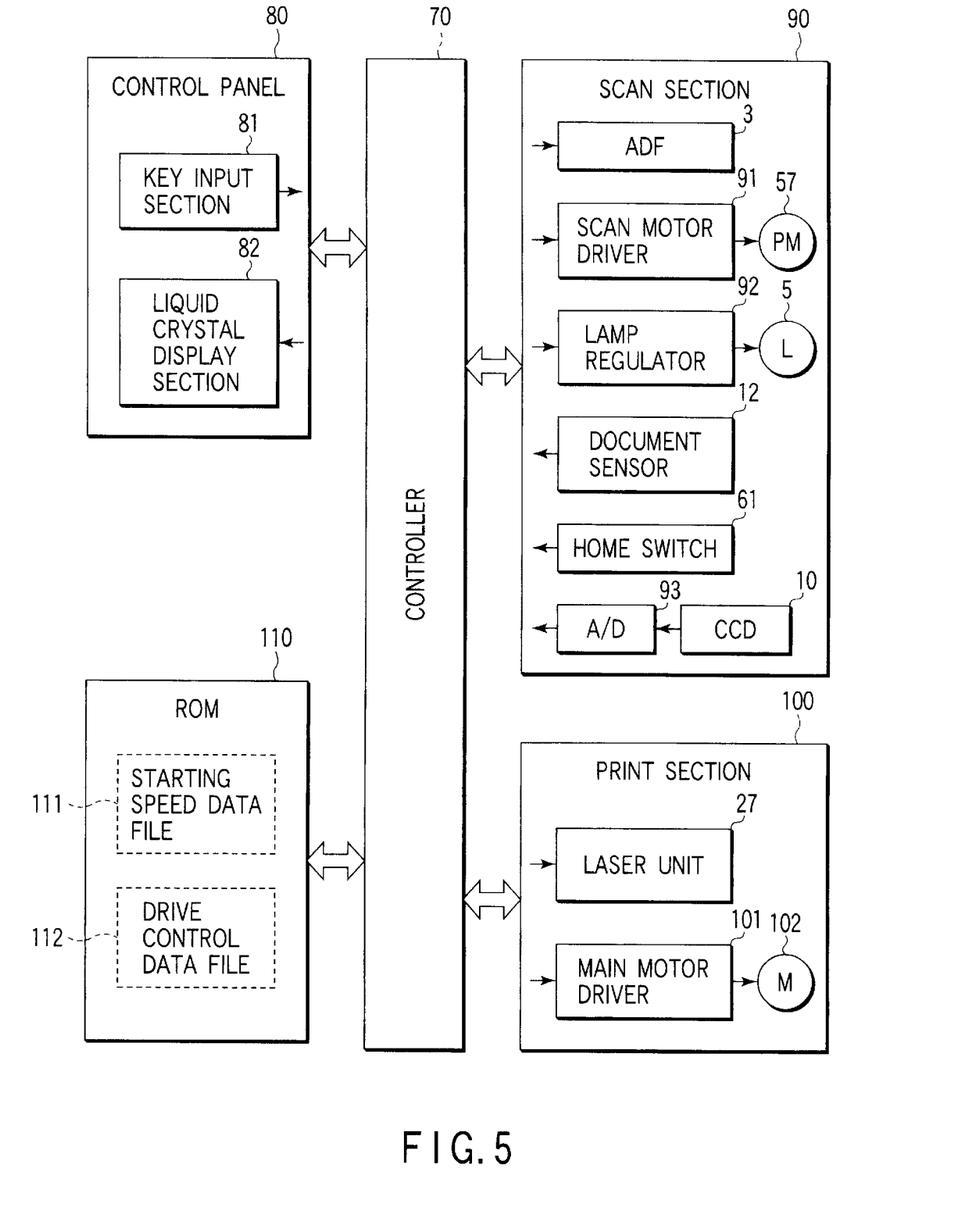
FIG. 5 is the block diagram of the main part of a control circuit in one embodiment.

The main part of a control circuit is shown in FIG. 5.

A control panel 80, a scan section 90, a print section 100, and a ROM 110 as storage means are connected to a controller 70.

The control panel 80 has a key input section 81 and a liquid crystal display section 82 and is provided on the upper face part of the main body 1. The key input section 81 has a power supply switch, a copy key, a document size set key, a magnification set key, and the like. The liquid crystal display section 82 displays various kinds of information in response to the operation of the key input section 81.

The scan section 90 has the automatic document feeder 3, a scan motor driver 91, a lamp regulator 92, the document sensor 12, the home switch 61, an analog/digital converter 93, and the like. The scan motor 91 outputs the driving voltage pulse for the scan motor 57. The lamp regulator 92 outputs electric power for lighting the exposure lamp 5. The analog/digital converter 93 converts the image signal outputted from the CCD 10 into the digital signal.

The print section 100 has the laser unit 27, a main motor driver 101, and the like. The main motor driver 101 outputs a driving electric power for a main motor 102. The main motor 102 drives the photoreceptor drum 20, the conveyer mechanism of the copy paper P, and the like.

In the ROM 110, a starting speed data file 111, a drive control data file 112, and the like are stored.

The scan motor 57 has a characteristic that a sufficient torque necessary for starting the motor itself can be obtained if the speed at the time of starting is a specified value Vs or less and thus the step-out at the time of starting can be prevented. Starting speed data for specifying an arbitrary starting speed V1 that is the specified value Vs or less are stored in the starting speed data file 111.

Figure 6:
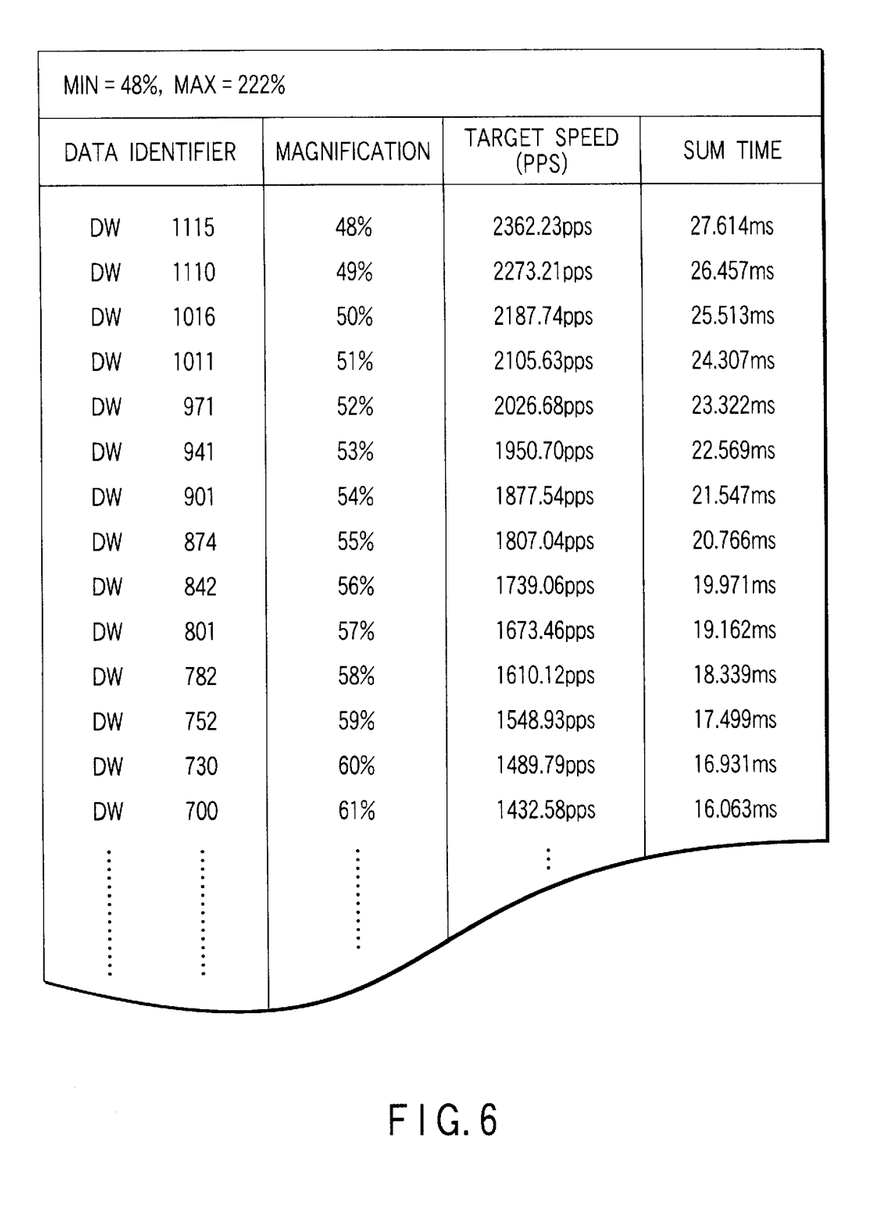
FIG. 6 is a block diagram showing an example of drive control data in one embodiment.

A plurality of drive control data tables corresponding to the differences in the document sizes are stored in the drive control data file 112. These drive control data tables are those to which a data identifier, a target speed, a sum time (time since the starting until the target speed is reached) are allocated for each step of copy magnification (minimum 48%, maximum 222%), for example, as shown in FIG. 6. The target speed corresponds to the number of the driving voltage pulses supplied to the scan motor in one second.

The controller 70 is provided with the following means [1] and [2] as a main function:

[1] First control means first operates the scan motor 57 acceleratively, then operates it by a constant speed, and finally operates it deceleratively, when the carriage 4 goes forth.

[2] Second control means operates the scan motor 57 by a constant speed from beginning to end when the carriage 4 goes back.

Figure 7:
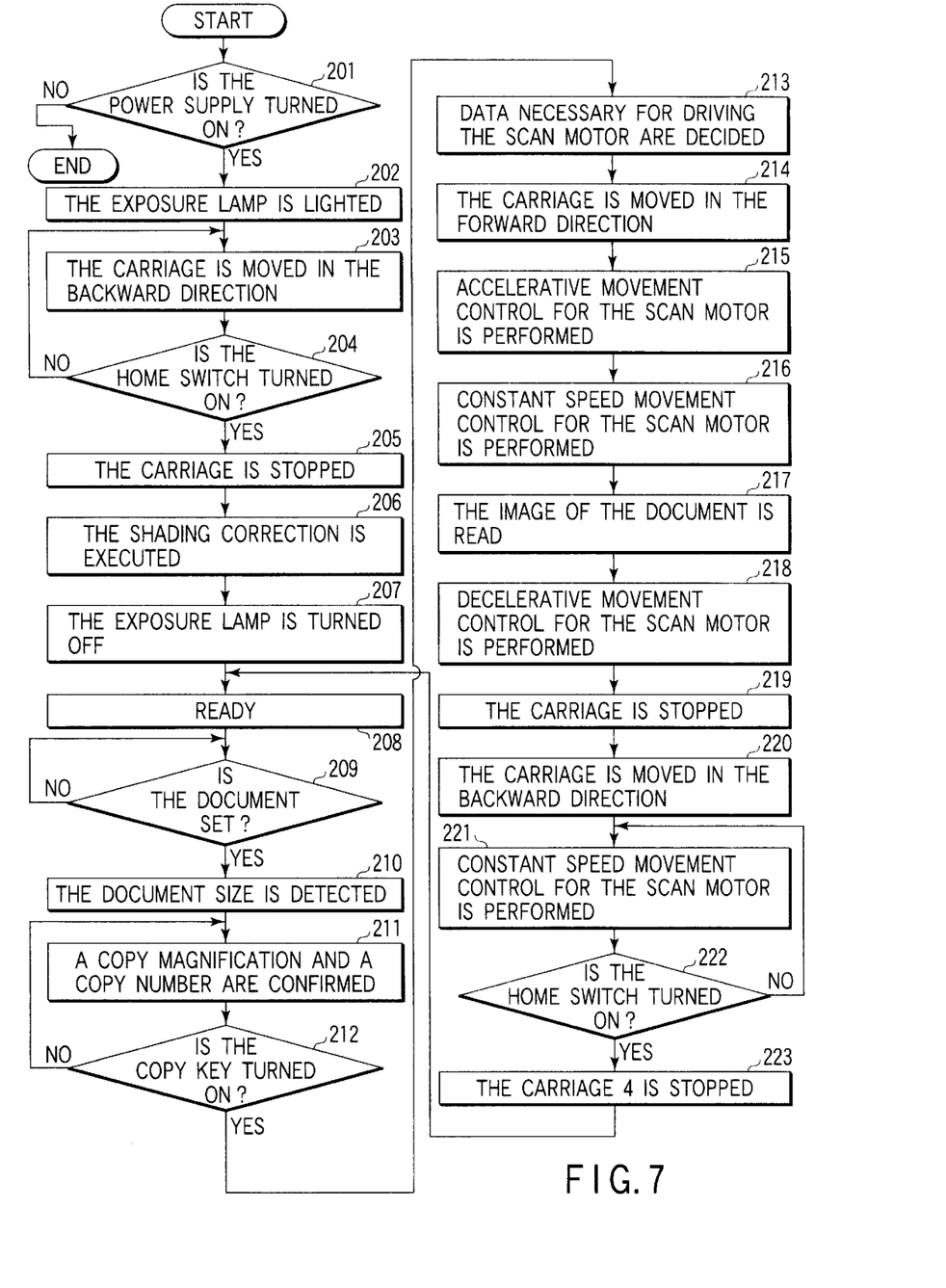
FIG. 7 is a flowchart for explaining an operation of one embodiment.

Next, interactions will be explained, referring to the flowchart of FIG. 7.

When the power supply switch of the control panel 80 is turned on (step 201), the exposure lamp 5 is lighted (step 202), and the scan motor 57 is driven so that the carriage 4 is moved backward (step 203).

When the carriage 4 reaches the home position so that the home switch 61 is turned on (YES of step 204), the movement of the carriage 4 is stopped (step 205). The light emitted from the exposure lamp 5 then strikes the plate 13 for correcting shading, and the reflection light from that plate 13 is led to the CCD 10 so that the shading correction is executed (step 206). When the shading correction is finished, the exposure lamp 5 is turned off to be in a standby state (step 208). At this time, the content of the standby state is displayed on the liquid crystal display section 82 of the control panel 80.

When the document 11 is set on the document table 2, this condition is detected by the document sensor 12 (YES of step 209). At the same time, the size of the document 11 is detected by the document sensor 12 (step 210).

In the control panel 80, the copy magnification, a copy number, and the like have been set by a user, and the set content is confirmed (step 211).

When the copy key of the control panel 80 is turned on (YES of step 212), data necessary for driving the scan motor 57 are decided (step 213) based on the starting speed data file 111 and the drive control data file 112 inside the ROM 110 as follows.

First, according to the starting speed data inside the starting speed data file 111, decided is the starting speed V1 of the scan motor 57 at the time of starting the going forth motion of the carriage 4. Further, one drive control data table corresponding to the size of the document 11 detected by the document sensor 12 is selected in the drive control data file 112, and the selected drive control data table is referred to based on the copy magnification confirmed as described above so that an operating pattern of the scan motor 57 at the time of the going forth of the carriage 4 and an operating pattern of the scan motor 57 at the time of the going back of the carriage 4 are decided.

Figure 8:
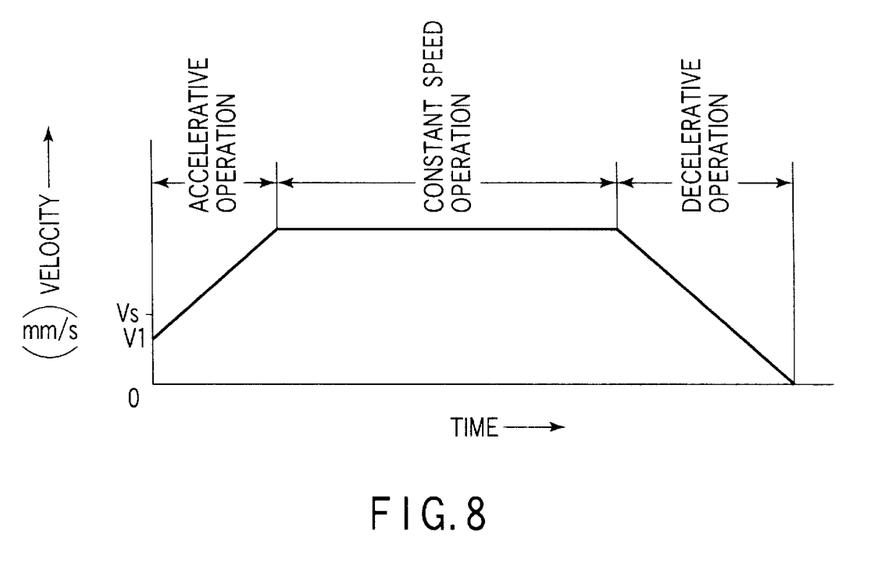
FIG. 8 is a view showing an operating pattern of a scan motor at the time of going forth motion of the carriage in one embodiment.

The scan motor 57 is started in a forward direction by the starting speed V1 based on the turn on of the copy key as shown in FIG. 8, and the carriage 4 starts going forth (movement in the forward direction) (step 214). Accelerative movement control for acceleratively operating the scan motor 57 to the target speed is then performed (step 215).

When the speed of the scan motor 57 reaches the target speed, constant speed movement control for operating the scan motor 57 by a constant speed of the target speed is performed (step 216). During the time period in which this constant speed movement control is performed, the image of the document 11 is read (step 217).

After the constant speed movement control is performed, decelerative movement control for deceleratively operating the scan motor 57 is performed (step 218).

When the scan motor 57 is stopped by the decelerative movement control, the scan motor 57 is started in the reverse direction, and the carriage 4 starts going back (movement in the backward direction) (step 220).

Figure 9:
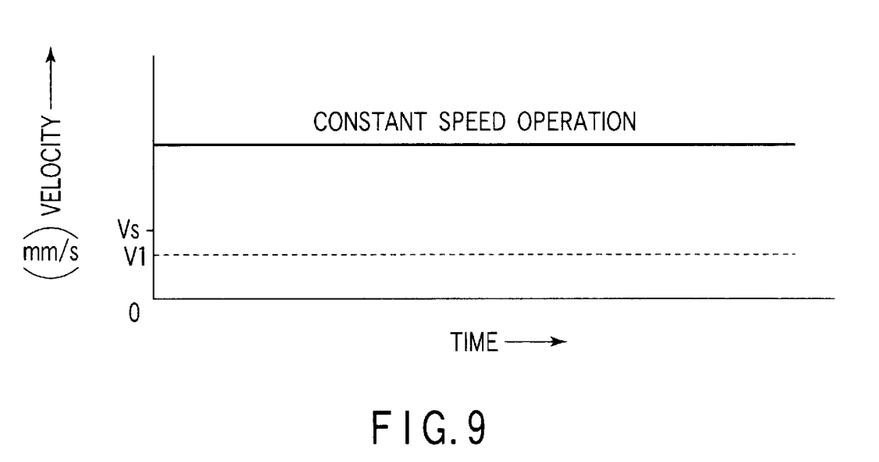
FIG. 9 is a view showing an operating pattern of the scan motor of the time of going back motion of the carriage in one embodiment.

At this time of going back, as shown in FIG. 9, the constant speed movement control performed at the time of going forth of the carriage 4 is employed as it is. That is, the scan motor 57 operates by the constant velocity of the target speed from the starting to the stopping (step 221).

When the carriage 4 goes back and reaches the home position, the switch 61 is turned on (YES of step 222). The driving of the scan motor 57 is stopped in response to this turn on of the switch 61, and the carriage 4 is stopped (step 223). Then, the step returns to the standby state of the step 208.

When the going back movement of the carriage 4 is started, since the starting speed of the scan motor 57 is in a higher state than that of the specified value Vs, there is a possibility that step-out occurs in the scan motor 57. However, even if the step-out occurs, the carriage 4 can go back surely to the home position. Moreover, since reading image by the exposure means has already been finished by the time of going forth of the carriage 4, even if step-out occurs in the scan motor 57, there is no problem.

As described above, when the carriage 4 goes forth, performed are the accelerative movement control, constant speed movement control, and decelerative movement control of the scan motor 57 according to the drive control data inside the ROM 110, and when the carriage 4 goes back, employed is the constant speed movement control of the time of going forth as it is, to operate the scan motor 57 by the constant speed. Thus, the drive control data for the scan motor 57 can be reduced considerably, compared with the case in which the accelerative movement control, constant speed movement control, and decelerative movement control are performed in both the going forth time and the going back time.

Since the drive control data for the scan motor 57 can be reduced considerably, the capacity of the memory 110 as the storage means can be reduced, or an empty capacity of the memory 110 can be increased. When the capacity of the memory 110 can be reduced, a miniaturization and a cost reduction of the memory 110 can be achieved. When the empty capacity of the memory 110 is increased, an effective utilization of the empty capacity can be achieved by employing the increased empty capacity for data storage for other processes (e.g., shading correction or the like) or the like.

In the above embodiment, the scan motor 57 is operated by the same constant speed as that of the constant speed operation of the time of going forth of the carriage 4 (=target speed) when the carriage 4 goes back. However, the scan motor 57 may be operated by a constant speed of the starting speed V1 based on the starting speed data inside the ROM 110 as shown by a broken line in FIG. 9. In this case, step-out at the time of starting of the scan motor 57 can be prevented from happening even when the carriage 4 goes back.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning apparatus for scanning an image on an original document placed on a document table by moving a carriage, comprising:

a pulse motor which rotates in accordance with a predetermined data and moves the carriage;

a memory which stores a first data for driving the pulse motor in order to accelerate the carriage, a second data for driving the pulse motor in order to move the carriage in a constant speed, and a third data for driving the pulse motor in order to decelerate the carriage; and a controller which supplies the first data, the second data and the third data to said pulse motor in order to move the carriage along a first direction, and supplies only the second data to said pulse motor in order to move the carriage along a second direction opposite to the first direction.

2. A scanning apparatus according to claim 1, wherein said first direction corresponds to a direction from a home position of the carriage to a scan end position, and said second direction corresponds to a direction from the scan end position to the home position.

3. A scanning apparatus according to claim 1, further comprising:
   a second memory which stores a starting speed of said pulse motor at a beginning of a rotation,
   wherein said controller supplies the first data to said pulse motor and controls said pulse motor to rotate at a speed lower than the starting speed at the beginning of a rotation.

4. A scanning apparatus according to claim 1, wherein said controller supplies the second data to said pulse motor and controls said pulse motor to move the carriage along the second direction at the same speed as the first direction.

5. A scanning apparatus according to claim 1, wherein said pulse motor has a specified starting speed in which a step-out does not occur.

6. A scanning apparatus according to claim 5, wherein said controller supplies the first data to said pulse motor and controls said pulse motor to rotate at a speed lower than the specified speed.

7. A scanning apparatus according to claim 5, wherein said controller controls said pulse motor to rotate at a speed lower than the specified speed when the carriage moves along the second direction.

8. A pulse motor driving method for scanning an image on an original document placed on a document table by moving a carriage, comprising:
   supplying a first data for driving the pulse motor in order to accelerate the carriage, a second data for driving the pulse motor in order to move the carriage in a constant speed, and a third data for driving the pulse motor in order to decelerate the carriage, to the pulse motor in order to move the carriage along a first direction; and
   supplying only the second data to said pulse motor in order to move the carriage along a second direction opposite to the first direction.

9. A scanning apparatus for scanning an image on an original document placed on a document table by moving a carriage, comprising:
   a pulse motor which rotates in accordance with a predetermined data and moves the carriage;
   an input device which sets a scanning magnification ratio;
   a first memory which stores an image scanning speed corresponding to the scanning magnification ratio;
   a second memory which stores a first data for driving the pulse motor in order to accelerate the carriage to the image scanning speed, a second data for driving the pulse motor in order to move the carriage in the image scanning speed corresponding to the scanning magnification ratio set by said input device, and a third data for driving the pulse motor in order to decelerate the carriage; and
   a controller which supplies the first data, the second data and the third data to said pulse motor in order to move the carriage along a first direction, and supplies only the second data to said pulse motor in order to move the carriage along a second direction opposite to the first direction.

10. A scanning apparatus according to claim 9, wherein said first direction corresponds to a direction from a home position of the carriage to a scan end position, and said second direction corresponds to a direction from the scan end position to the home position.

11. A scanning apparatus according to claim 9, wherein said controller supplies the second data to said pulse motor and controls said pulse motor to move the carriage along the second direction at the same speed as the first direction.

12. A scanning apparatus according to claim 9, wherein said pulse motor has a specified starting speed in which a step-out does not occur.

13. A scanning apparatus according to claim 12, wherein said controller supplies the first data to said pulse motor and controls said pulse motor to rotate at a speed lower than the specified speed.

14. A scanning apparatus according to claim 12, wherein said controller controls said pulse motor to rotate at a speed lower than the specified speed when the carriage moves along the second direction.

15. An image forming apparatus for reciprocatively operating exposure means along a document table by an operation of a motor, scanning and exposing the document table when the exposure means goes forth to read the image of the document, and forming the read image on an image formed medium, said apparatus comprising:
   first control means for first acceleratively operating, then operating by a constant speed, and finally deceleratively operating the motor when the exposure means goes forth; and
   second control means for operating the motor by a constant speed from beginning to end when the exposure means goes back,
   wherein the second control means operates the motor by the same constant speed as that of the first control means from beginning to end.

16. An image forming apparatus for reciprocatively operating exposure means along a document table by an operation of a motor, scanning and exposing the document table when the exposure means goes forth to read the image of the document, and forming the read image on an image formed medium, said apparatus comprising:
   first control means for first acceleratively operating, then operating by a constant speed, and finally deceleratively operating the motor when the exposure means goes forth; and
   second control means for operating the motor by a constant speed from beginning to end when the exposure means goes back,
   wherein the motor is a pulse motor, and step-out does not occur when the starting speed is a specified value or less,
   the first control means starts the motor by a speed of the specified value or less when the accelerative operation of the motor is started, and
   the second control means operates the motor by the same constant speed as that of the first control means from beginning to end.

17. An image forming apparatus for reciprocatively operating exposure means along a document table by an operation of a motor, scanning and exposing the document table when the exposure means goes forth to read the image of the document, and forming the read image on an image formed medium, said apparatus comprising:
   first control means for first acceleratively operating, then operating by a constant speed, and finally deceleratively operating the motor when the exposure means goes forth; and
   second control means for operating the motor by a constant speed from beginning to end when the exposure means goes back, wherein the motor is a pulse motor, and step-out does not occur when the starting speed is a specified value or less, the first control means starts the motor by a speed of the specified value or less when the accelerative operation of the motor is started, and the second control means operates the motor by a speed of the specified value or less from beginning to end.

18. An image forming apparatus for reciprocatively operating exposure means along a document table by an operation of a motor, scanning and exposing the document table when the exposure means goes forth to read the image of the document, and forming the read image on an image formed medium by a predetermined magnification, said apparatus comprising:

first control means first acceleratively operating to a target speed corresponding to the predetermined magnification, then operating by a constant velocity of the target speed, and finally deceleratively operating the motor when the exposure means goes forth; and second control means operating the motor by an arbitrary constant speed from beginning to end when the exposure means goes back, wherein the second control means operates the motor by the same constant speed as that of the first control means from beginning to end.

19. An image forming apparatus for reciprocatively operating exposure means along a document table by an operation of a motor, scanning and exposing the document table when the exposure means goes forth to read the image of the document, and forming the read image on an image formed medium by a predetermined magnification, said apparatus comprising:

first control means first acceleratively operating to a target speed corresponding to the predetermined magnification, then operating by a constant velocity of the target speed, and finally deceleratively operating the motor when the exposure means goes forth; and second control means operating the motor by an arbitrary constant speed from beginning to end when the exposure means goes back, wherein the motor is a pulse motor, and step-out does not occur when the starting speed is a specified value or less, the first control means starts the motor by a speed of the specified value or less when the accelerative operation of the motor is started, and the second control means operates the motor by the same constant speed as that of the first control means from beginning to end.

20. An image forming apparatus for reciprocatively operating exposure means along a document table by an operation of a motor, scanning and exposing the document table when the exposure means goes forth to read the image of the document, and forming the read image on an image formed medium by a predetermined magnification, said apparatus comprising:

first control means first acceleratively operating to a target speed corresponding to the predetermined magnification, then operating by a constant velocity of the target speed, and finally deceleratively operating the motor when the exposure means goes forth; and second control means operating the motor by an arbitrary constant speed from beginning to end when the exposure means goes back, wherein the motor is a pulse motor, and step-out does not occur when the starting speed is a specified value or less, the first control means starts the motor by a speed of the specified value or less when the accelerative operation of the motor is started, and the second control means operates the motor by a speed of the specified value or less from beginning to end.

* * * * *

UNITED STATES PATENT AND TRADEMARK OFFICE
CERTIFICATE OF CORRECTION

PATENT NO. : 6,510,302 B1  Page 1 of 1
DATED : January 21, 2003
INVENTOR(S) : Michiaki Konno et al.

It is certified that error appears in the above-identified patent and that said Letters Patent is hereby corrected as shown below:

<u>Title page,</u>
Item [22], PCT Filed:, please delete "April 4, 2001" and insert -- November 22, 2000 --

Signed and Sealed this

Nineteenth Day of August, 2003

JAMES E. ROGAN
*Director of the United States Patent and Trademark Office*